United States Patent [19]

Lagakos et al.

[11] Patent Number: 4,994,668

[45] Date of Patent: Feb. 19, 1991

[54] PLANAR FIBER-OPTIC INTERFEROMETRIC ACOUSTIC SENSOR

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 402,174

[22] Filed: Sep. 1, 1989

[51] Int. Cl.$^5$ .................................................. H01J 5/16
[52] U.S. Cl. .................................. 250/227.19; 356/345
[58] Field of Search .................. 250/227.19; 356/345; 350/96.29, 96.15, 96.33, 96.34, 96.30

[56] References Cited

U.S. PATENT DOCUMENTS

| | | | |
|---|---|---|---|
| 4,162,397 | 7/1979 | Bucaro et al. | 250/199 |
| 4,193,130 | 3/1980 | Young et al. | 367/149 |
| 4,238,856 | 12/1980 | Bucaro et al. | 455/614 |
| 4,297,887 | 11/1981 | Bucaro | 73/655 |
| 4,363,114 | 12/1982 | Bucaro et al. | 367/149 |
| 4,427,263 | 1/1984 | Lagakos et al. | 350/96.33 |
| 4,454,418 | 6/1984 | Walker | 250/227 |
| 4,468,294 | 8/1984 | Hocker et al. | 204/27 |
| 4,482,205 | 11/1984 | Lagakos et al. | 350/96.34 |
| 4,519,252 | 5/1985 | McMahon | 73/655 |
| 4,530,078 | 7/1985 | Lagakos et al. | 367/149 |
| 4,609,290 | 9/1986 | Cahill | 356/354 |
| 4,621,896 | 11/1986 | Lagakos et al. | 350/96.29 |
| 4,697,876 | 10/1987 | Dyott | 350/96.29 |
| 4,709,987 | 12/1987 | Blackburn et al. | 350/96.34 |
| 4,829,821 | 5/1989 | Carome | 73/516 |
| 4,832,437 | 5/1989 | Kim et al. | 350/96.15 |
| 4,843,233 | 6/1989 | Jeunhomme | 250/227 |
| 4,881,813 | 11/1989 | Koo | 250/227.19 |

OTHER PUBLICATIONS

N. Lagakos et al., "Frequency and Temperature Dependence of Elastic Moduli of Polymers", *J. Appl. Phys.*, 15 Jun. 1989, pp. 4017–4031.

N. Lagakos et al., "Planar Flexible Fiber-Optic Interferometric Acoustic Sensor", *Optics Letters*, vol. 13, p. 788, Sep. 1988.

Giallorenzi et al., "Optical Fiber Sensor Technology", *IEEE Journal of Quantum Electronics*, vol. QE-18, No. 4, Apr. 1982, pp. 626–665.

*Primary Examiner*—David C. Nelms
*Attorney, Agent, or Firm*—Thomas E. McDonnell; Barry A. Edelberg

[57] ABSTRACT

A sensing portion for an interferometric acousto-optic sensor and a sensor using that sensing fiber are disclosed. The sensor fiber has an outer coating of a material having a low bulk modulus. This coating greatly enhances the sensitivity of the sensor fiber. In a preferred embodiment, the material of low bulk modulus embeds the sensor fiber and any included reference fiber. Most preferably, the material having a low bulk modulus is a polymer such as polyurethane. The sensing portions made according to the present invention will usually be incorporated into sensors used for underwater exploration.

14 Claims, 6 Drawing Sheets

PLANAR FIBER-OPTIC INTERFEROMETRIC ACOUSTIC SENSOR

BACKGROUND OF THE INVENTION

1. Field of the Invention

The present invention relates generally to acoustic sensors and more specifically to acousto-optic sensors.

2. Description of the Prior Art

Acousto-optic interferometric sensors are based upon the phase shift in light passing through a fiber which occurs when that fiber is exposed to acoustic waves. Such sensors generally include acoustically insensitive lead fibers attached to a sensor section which includes an acoustically sensitive sensor fiber and an acoustically insensitive reference fiber. A laser beam is split and transmitted through both the reference and sensor fibers. The difference in phase shift between the reference and sensor fibers is related to the strength of the sensed acoustic field. These types of sensors are described in further detail in various patents, such as U.S. Pat. Nos. 4,162,397, 4,297,887 and 4,363,114, all of which are incorporated herein.

Because the phase shift which occurs within any one length of fiber immersed in liquid is small, the fibers are arranged in a multipath configuration, such as a coil or spiral. Acoustic sensitivity is maximized when the sensor fiber is configured as a coil wound about a polymer mandrel such as Teflon or nylon. In such an arrangement, the transduction mechanism is indirect. The acoustic field generates strains within the mandrel which changes its diameter and thus the fiber length, which, in turn, modulates the phase. Unfortunately, that arrangement is unsuitable for a planar sensor.

Piezoactive polymers, such as polyvinylidene fluoride ($PVF_2$) have been successfully utilized as the transduction mechanism for acoustic sensing. Piezoactive polymers provide a unique shape flexibility which permits their fabrication into two-dimensional sensors. However, the small electric output of the piezoactive polymers must be amplified at the wet end and is subject to electromagnetic interference.

SUMMARY OF THE INVENTION

Accordingly, it is an object of this invention to overcome the above-mentioned prior art deficiencies.

It is another object of the present invention to provide a fiber useful in a planar acousto-optic sensor of exceptionally good sensitivity.

It is a further object of the present invention to improve the sensitivity of a planar acousto-optic sensor.

These and additional objects of the invention are accomplished by embedding a concentrically wound or snaked sensor fiber and concentrically wound reference fiber of an acousto-optic interferometric sensor in a thick layer of a material having a low bulk modulus, permitting an increase in the sensitivity without increasing the distance between adjacent turns or curves of the sensor fiber.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DETAILED DESCRIPTION OF THE INVENTION

Figure 1:
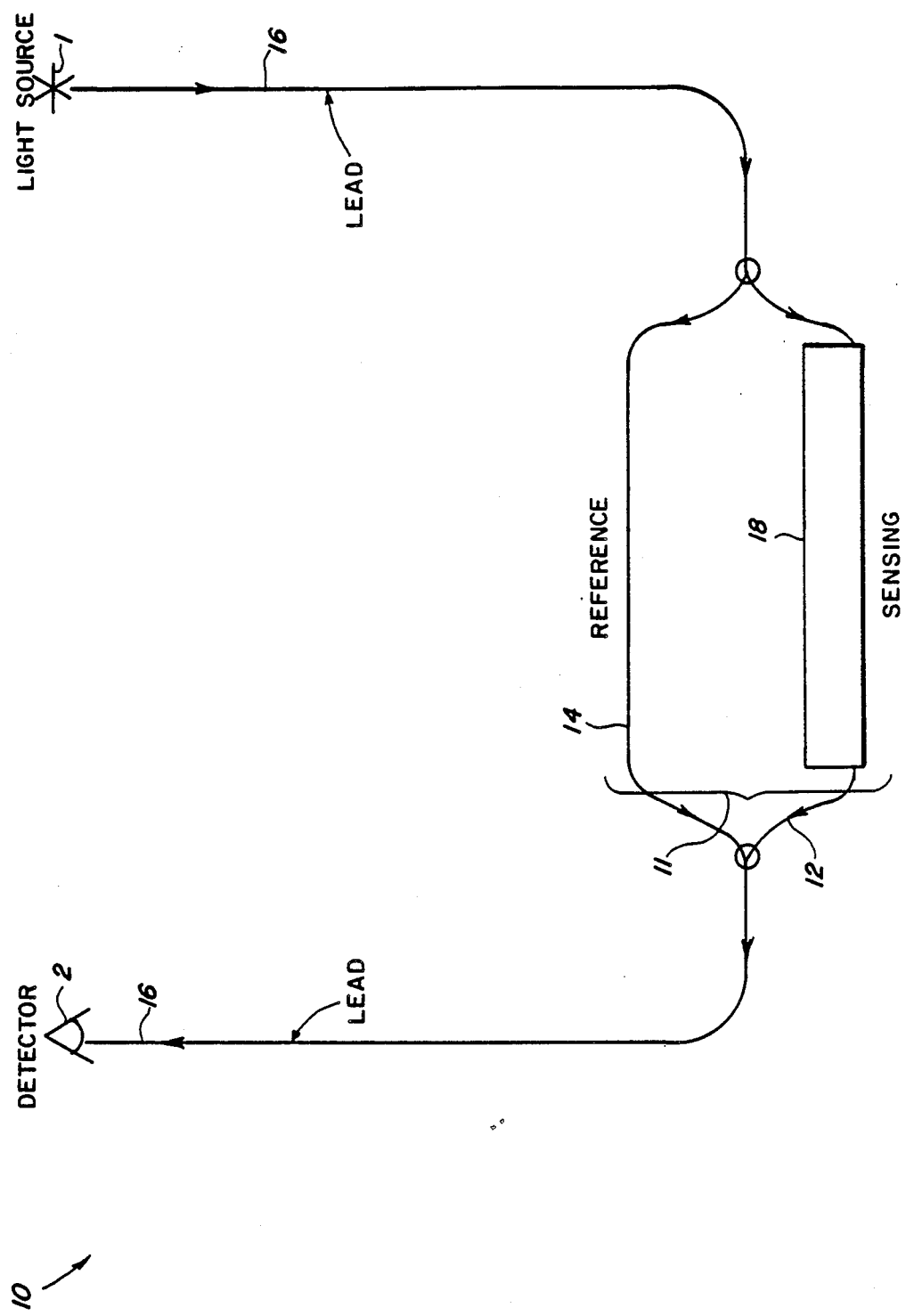
FIG. 1 is a schematic of a Mach-Zehnder interferometric fiber optic sensor according to the present invention.

With an interferometric fiber optic sensor as shown in FIG. 1, employing a light source 1 and a detector 2 connected by fibers 12, 14 and 16, optimum performance is achieved with maximum signal to noise ratio by maximizing the sensitivity of the sensing fiber in sensing portion 11 and desensitizing the sensitivity of the lead and reference fibers 16 and 14, respectively. The sensor 10, sensor fiber 12, reference fiber 14 and lead fiber 16 of the present invention have a structure similar to those commonly used in the interferometric acoustic sensors described in the above-mentioned patents. In the present invention, by embedding the sensing portion in a thick layer 18 of a material of low bulk modulus, the sensitivity of the sensor fiber is enhanced, while the reference fiber remains substantially insensitive.

Pressure sensitivity, $\Delta\phi/\phi\Delta\rho$, is a function of the axial strain $\epsilon_z$, and the radial strain, $\epsilon_r$, in the core of the fiber:

$$\Delta\phi/\phi = \epsilon_z - (n^2/2)[(P_{11}+P_{12})\epsilon_r + P_{12}\epsilon_z].$$

Here $P_{11}$ and $P_{12}$ are the elasto-optic coefficients of the core and n is the refractive index of the core. The first term in the equation results from the fiber length change, while the second and third terms result from the refractive index modulation of the core, which is related to the photoelastic effect.

The strains $\epsilon_z$ and $\epsilon_r$, which are related to the geometry and composition of the fiber, can be calculated from the stresses and displacements in the various fiber layers by applying the appropriate boundary conditions.

Figure 2:
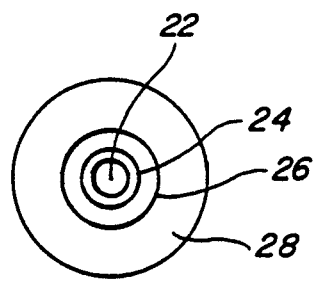
FIG. 2 is a schematic drawing of a typical single mode fiber used in conjunction with the present invention.

FIG. 2 shows a typical optical fiber 20 used in sensors such as the one shown is FIG. 1. Optical fiber 20 consists of a light-transmitting solid core 22, clad 24, each typically fabricated from glasses having similar properties, and a protective soft buffer layer 26. Typically, this waveguide is first with a hard outer polymer 28, or metal jacket to preserve the fiber strength. Table 1 lists the fiber parameters of a typical fiber useful in the present invention and shown in FIG. 2. The fiber can be a Fujikura, high numerical aperture (0.17), single mode fiber which consists of a cylindrical 80 μm o.d. glass, a 220 μm o.d. soft coating (e.g., silicone) 24, and a 1 mm o.d. polyester (e.g., Hytrel 7246) outer coating 28. Of course, fibers with other geometries and coatings may be employed as sensor and/or reference fibers. For example, any relatively soft material, such as an elastomer (e.g., U.V.-curable polymers and rubbers) having a Young's modulus of less than about $1 \times 10^{10}$ dyn/cm² at 1 MHz within the temperature range of intended use (generally at room temperature, but at least somewhere between 0 and 35° C.) may be used as the primary soft coating 24. Even soft metals can be used as the primary soft coating (buffer layer). Also, substances, especially plastics, other than polyester may be used as the outer hard protective coating. In general the outer coating 28 should have a Young's modulus within the range of $2-4 \times 10^{10}$ dyn/cm² at 1 MHz within the above stated temperature range of intended use.

Further, according to the present invention, either the hard outer protective coating or both the soft coating (buffer layer) and the hard outer protective coating may be eliminated and the material of low bulk modulus can directly contact the sensor fiber or the buffer layer. That arrangement is further enabled where the sensor fiber is embedded within the material of low bulk modulus. In any event, especially if a hard outer coating is used, it is generally preferable to protect the sensor fiber with a buffer coating. Also, the use of at least a buffer coating, and preferably the further use of a thin hard outer protective layer, in consecutive concentric layers around the glass, can be useful even if the sensor fiber is embedded within the material of low bulk modulus. When used in such an embodiment, these layers prevent damage to the sensor fiber during handling prior to its being embedded within the low bulk modulus material.

Figure 3:
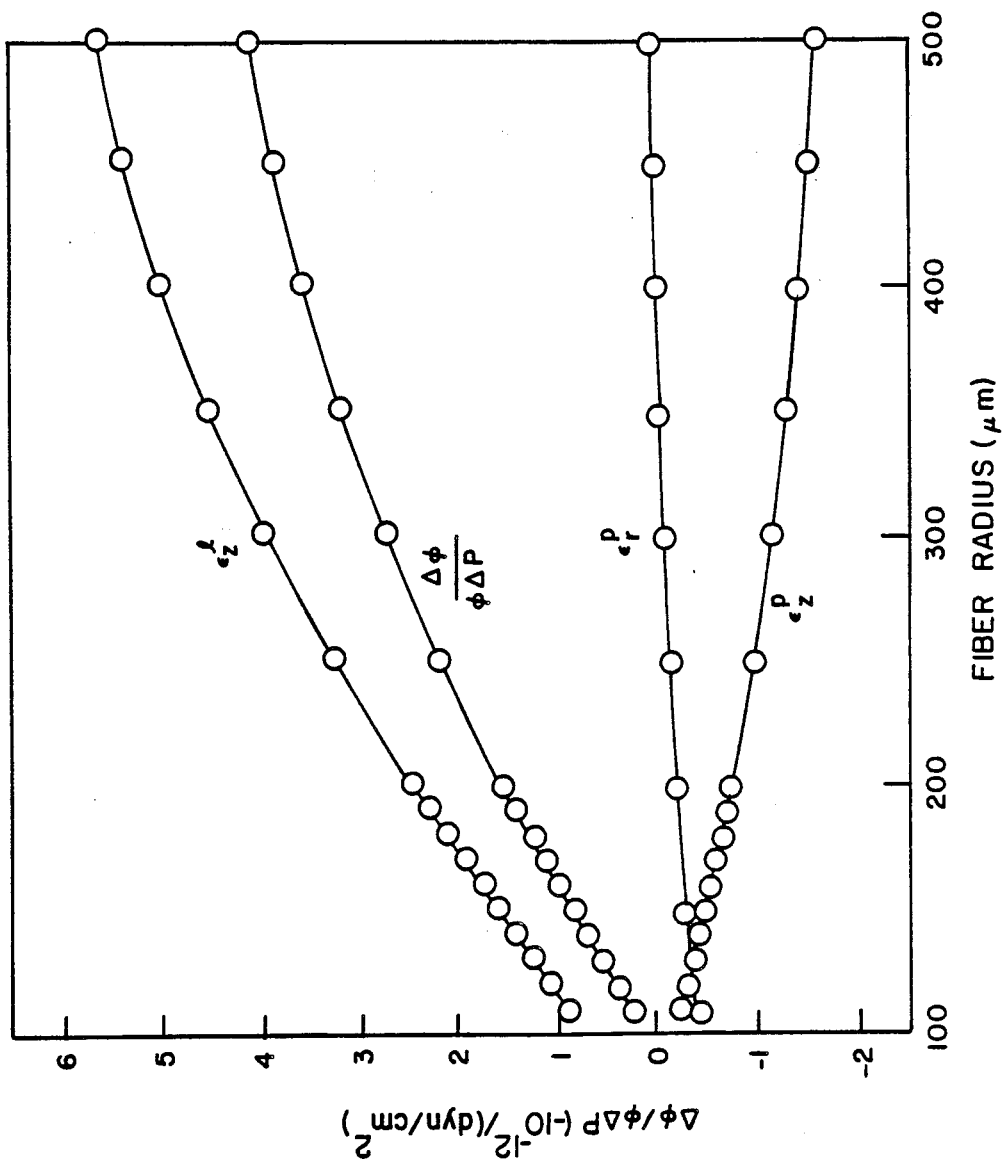
FIG. 3 is a graph showing the calculated pressure sensitivity, with separate curves for phase change due to length change and to refractive-index modulation of the fiber of Table 1 as a function of outer coating (Hytrel) thickness.

Among the various strains in the equation, the largest contribution, $\epsilon^l_z$, results from the fiber length change, as can be seen from FIG. 3. The $\epsilon^p_r$ and $\epsilon^p_z$ terms (the last two terms in the equation) are due to the photoelastic effect and they give smaller contributions of opposite polarity. As the outer coating thickness increases (FIG. 3), the magnitude of the pressure sensitivity increases rapidly due primarily to the $\epsilon^l_z$ change.

In general, the acoustic sensitivity is a very strong function of the elastic moduli of the outer hard polymer coating of the fiber. High sensitivity can be achieved with coatings of low bulk modulus and high Young's modulus materials. This can be understood as follows: for thick coatings the sensitivity is determined by the bulk modulus which governs the fiber dimensional changes. For typical fibers, however, both the bulk and the Young's moduli are important. In this case, the bulk modulus determines the "maximum" fiber dimensional changes, while the Young's modulus governs the fraction of these changes, or strains, which can communicate to the fiber core. For a small coating thickness a high Young's modulus results in high sensitivity since it can communicate a high fraction of the applied stress to the fiber core, while a low Young's modulus requires substantial coating thickness. The reference fiber can be desensitized so that it cannot transfer any axial stresses to the fiber core. With the radial stress transferred only to the core, the fiber acoustic sensitivity is greatly reduced, as can be seen from FIG. 3.

Figure 4:
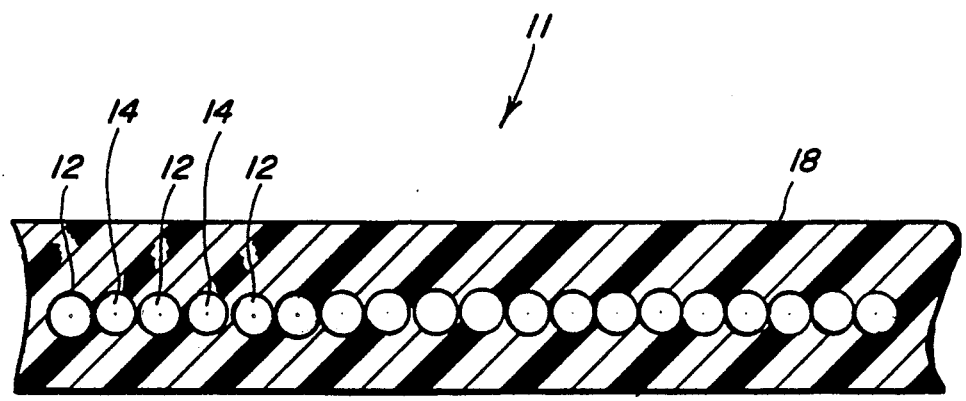
FIG. 4 is a cross-sectional view of the sensing portion of a sensor according to the present invention.
Figure 4A:
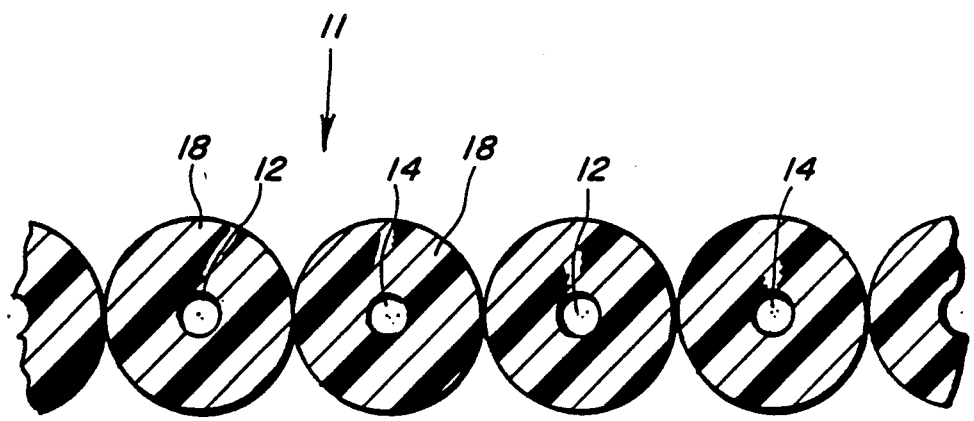
FIG. 4a is a cross-sectional view of an approximate model of the sensing portion illustrated in FIG. 4, used for calculating the acoustic response of a sensing portion fabricated in accordance with the present invention.
Figure 5:
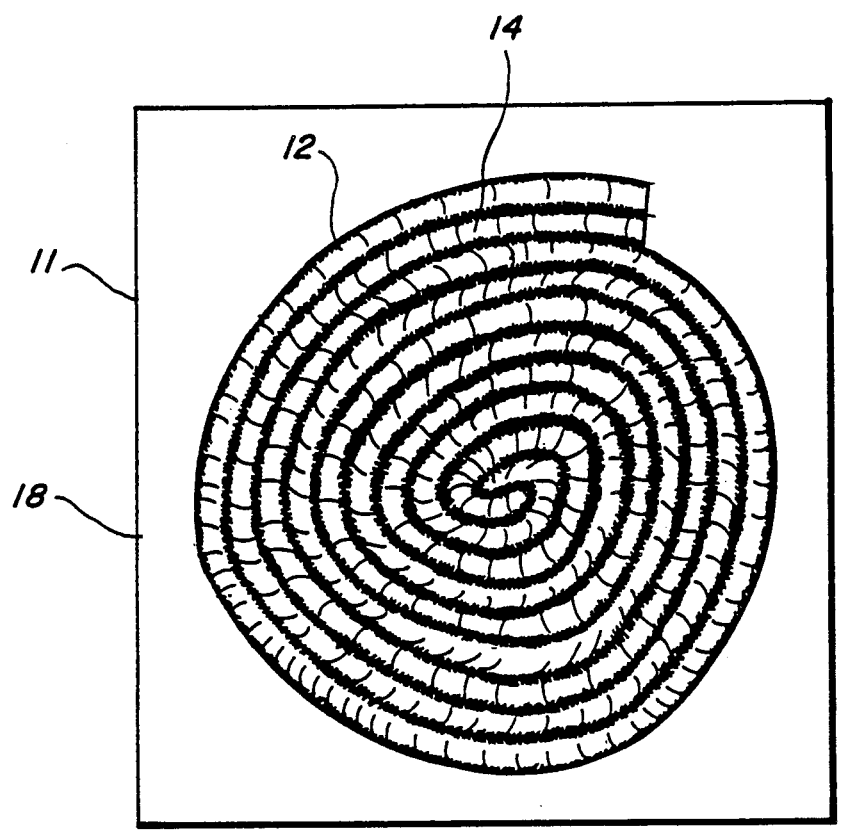
FIG. 5 is a top view of a sensing portion of sensor fabricated in accordance with a preferred embodiment according to the present invention.

FIG. 4 illustrates a cross-section of sensing portion 11 of sensor 10 according to the present invention, while FIG. 4a shows an approximate model of sensing portion 11 shown in FIG. 4. Each glass fiber of the sensors shown in FIGS. 4 and 4a can have the structure shown in FIG. 2, or may lack either the hard outer protective coating or both the hard outer protective coating and the soft buffer layer. A length of sensor fiber 12 is coiled within a plane, preferably as a spiral. Reference fiber 14, which has been made insensitive to pressure, is wound jointly with the sensor fiber 12 (FIG. 5). The entire sensing portion 11 is embedded within an essentially planar, essentially continuous, thick coating 18 of a material of low bulk modulus.

The material of low bulk modulus of this invention should have a bulk modulus of no greater than about 5 $10^{10}$ dyn/cm², and preferably no greater than about 3.38 $10^{10}$ dyn/cm², at 1 MHz at the temperature of the environment in which it is intended to be used. The lower the bulk modulus, the greater the sensitivity of the sensor. For wide band operation, materials with frequency and temperature independent bulk modulus should be used. Typical temperatures in which sensors of the present invention are employed are from 0°–35° C. Usually, the material of low bulk modulus will be a polymer. Suitable polymers include elastomers such as polyurethane (particularly EN-9 and Uralite 3130) and Teflon TFE type II, both of which are particularly advantageous because they exhibit a suitable bulk modulus at all temperatures throughout the entire temperature range mentioned above. The bulk modulus of various polymers at temperatures from 0°–35° C. is described in Lagakos et al, *J. Appl. Phys.*, Vol. 59, No. 12, 15 June 1986, pages 4017-31, incorporated herein by reference. The polyurethane materials mentioned above are particularly advantageous due to their castability and flexibility, which eases manufacturing and permits the sensor to be mounted upon a variety of surfaces.

The core and clad thicknesses are not critical to the present invention. However, fibers which are too thin are known to be fragile and difficult to handle, while fibers that are too thick may be difficult to coil or snake into the appropriate shape. Accordingly, for practical purposes apart from the present invention, the core will typically have a thickness of from 2 to 12 μm and the clad will typically have a thickness of from 80 to 135 μm.

Likewise, the soft coating (buffer layer) thicknesses and hard coating thicknesses (when these coatings are used) are not critical to the present invention and are only relevant to the ease of handling the sensor and/or reference fibers prior to their being coated or embedded within the low bulk modulus material. Typically, the buffer layer will have an outer diameter of from 200 to 250 μm and the hard coating will have an outer diameter of about from 200 to 600 μm.

Figure 6:
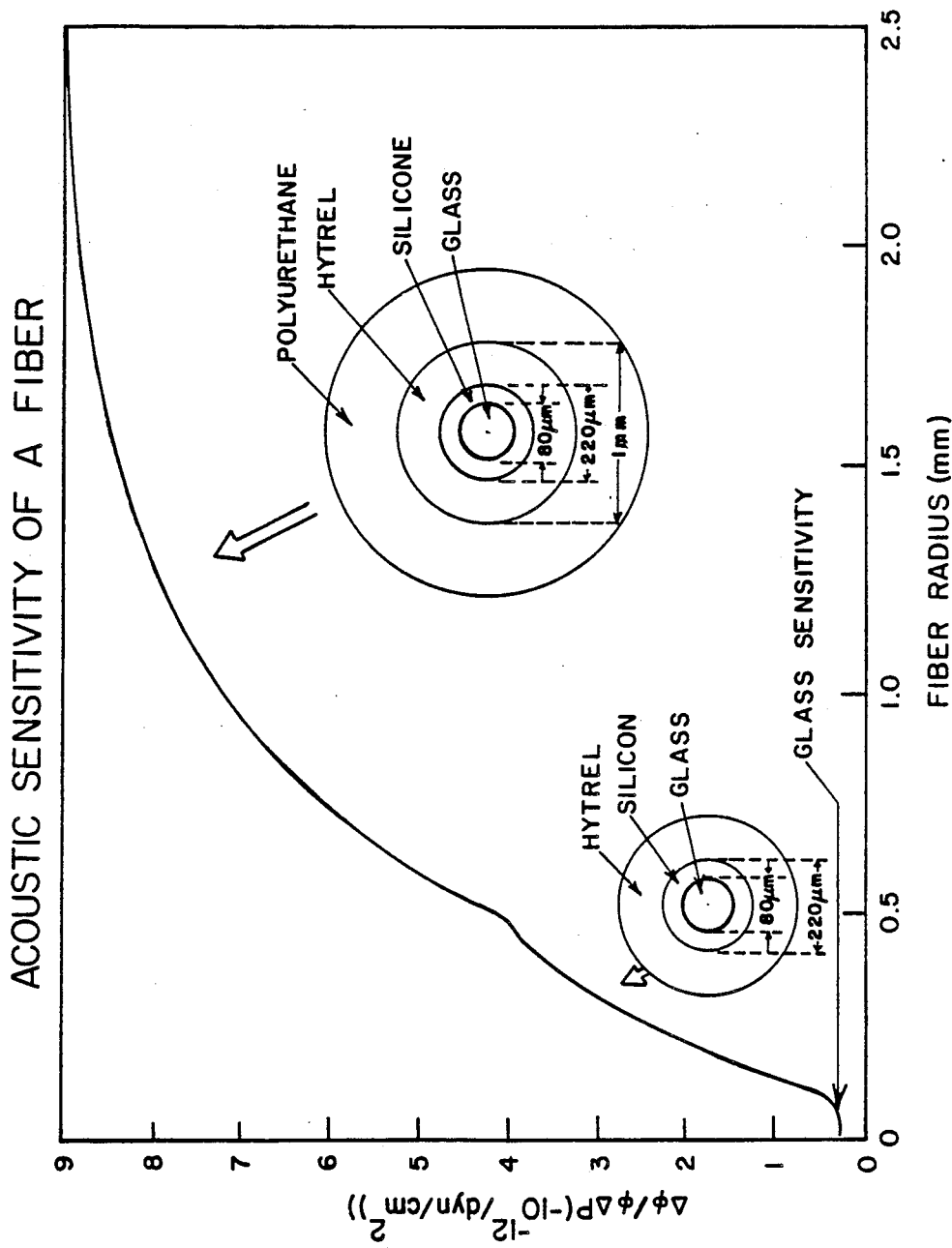
FIG. 6 is a graph of the acoustic sensitivity of a sensing fiber fabricated in accordance with a preferred embodiment of the present invention as a function of the total fiber radius.
Figure 6A:
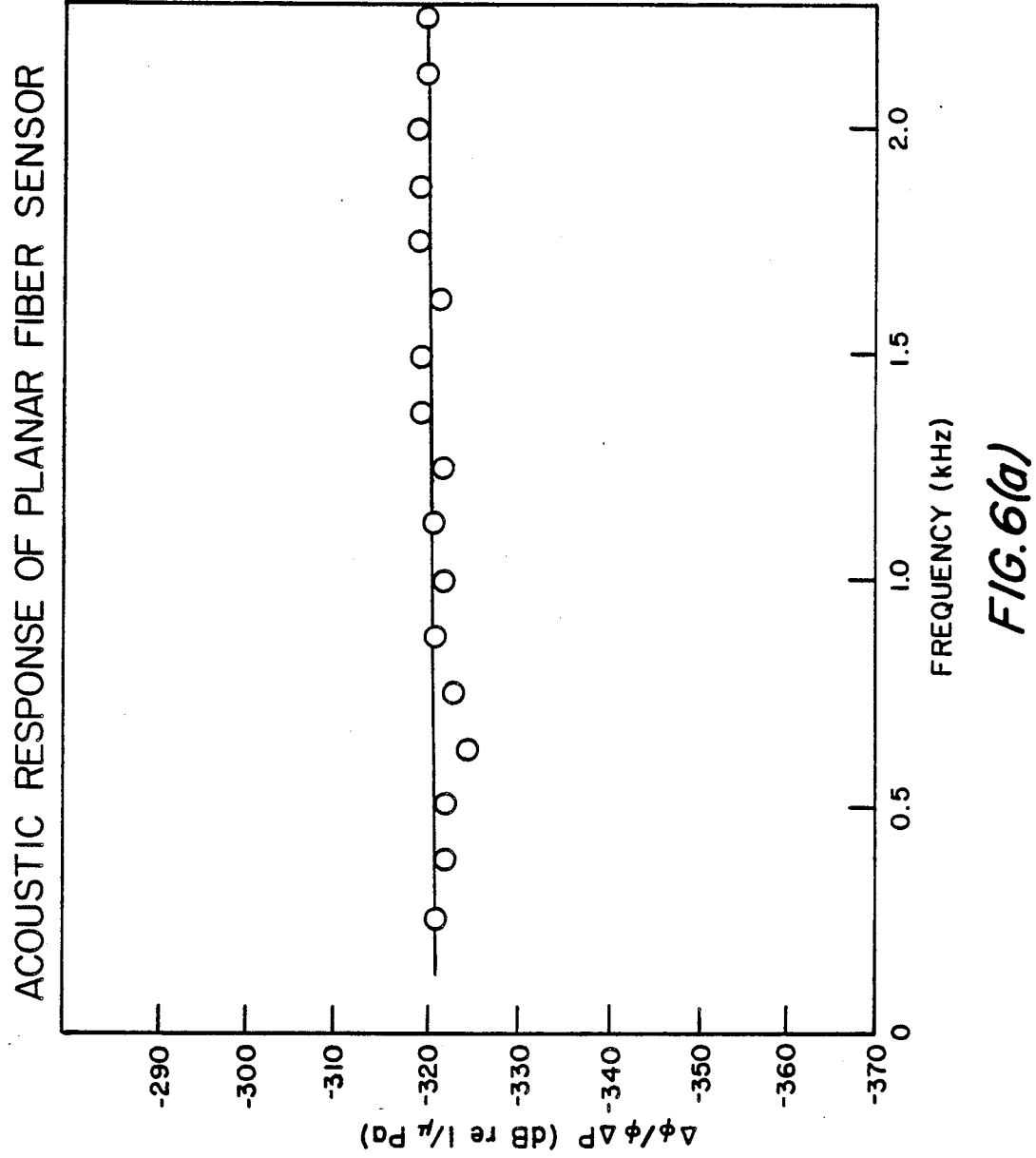
FIG. 6a is a graph showing the frequency response of a sensing fiber fabricated in accordance with the present invention.

The preferred thickness of the coating of material of low bulk modulus is best understood with reference to FIG. 6. FIG. 6 is an analytically calculated plot of sensitivity vs. total fiber radius for the approximate model shown in FIG. 4a, which assumes a concentric circular coating of low bulk modulus material about each fiber (the materials used in these calculations are described below in table 1 of the examples). Below a radius value of 0.110 mm, there is no Hytrel or polyurethane coating, only the silicone-coated glass. At greater than 0.110 mm, the Hytrel coating is taken into account, and it is this coating whose thickness is increasing until the 0.5 mm radius is reached. At this point, the polyurethane coating begins and continues indefinitely. This model agrees well with experimentally obtained results. The frequency response of this model, as calculated, is shown in FIG. 6a, and also agrees well with experimentally obtained results.

As shown in FIG. 6, the glass fiber sensitivity is increased slightly by the thin silicone coating, owing to its low Young's modulus (first part of the curve in FIG. 6). With a low Young's modulus, thick coatings are required to transfer significant strains to the hard glass. With the Hytrel as an additional coating, the sensitivity increases even more. The sensitivity increases rapidly for a small polyurethane thickness (where the Young's modulus controls the sensitivity), and then it gradually slows down as the polyurethane thickness approaches the thick coating limit where the sensitivity is determined by the bulk modulus. In this limit, hydrostatic-like strains are effectively transferred to the glass fiber. As can also be seen from FIG. 6, with 1-1.5 mm polyurethane thickness, most (about 70%) of the infinite-thickness sensitivity is obtained. Thus, for a 1 mm fiber with a polyurethane coating, the resulting fiber strains are both nearly hydrostatic and nearly the same as those that would be generated in a homogenous phase of polyurethane. Additionally, FIG. 6 illustrates that at a polyurethane coating thickness of about 2.3 mm, the curve becomes almost flat.

The above analysis is based on static models for the acoustically induced structural strains. These are expected to be valid up to frequencies somewhat below the first mechanical resonances of the structure. The first resonances that would be observed are expected to be the extensional vibrations (the response due to flexural waves would integrate to zero), which would be controlled by the back plate and which occur at frequencies significantly higher than 2500 Hz.

Thus, it becomes clear that the maximum thickness of the low bulk modulus material coating is infinite, although in practice the coating will rarely if ever be more than about 20 cm. The minimum thickness of the low modulus material coating should be that at which the sensitivity of the fiber approximates (about 65-70%) the sensitivity of that fiber with an infinite thickness of coating of the low bulk modulus material. These preferred minimum and maximum thicknesses for the coating of low bulk modulus material are independent of the diameter of the fiber which it surrounds.

For a glass sensor fiber as described above, a minimum thickness of the polyurethane coating, as also indicated above, would be about 1 mm. The minimum thickness for any type fiber and any coating materials could be determined by routine experimentation or could be readily calculated provided that the properties of the fiber and coating materials are sufficiently known.

The reference fiber, which is optional, can be desensitized by a variety of methods, as stated in the aforementioned patents. For example, the reference fiber can be coated with a material of high Young's modulus, usually Ni or a high modulus glass, radially inside of the coating of the low bulk modulus material. Such a hard coating significantly minimizes $\epsilon_z$ without affecting much $\epsilon_r$, so that the various terms in the previously mentioned equation can be balanced to zero with an appropriate coating thickness. In other respects, the reference and lead fibers may be similarly constructed, even though the reference fiber will be mounted within the low bulk modulus material if the entire sensing portion is mounted within that material as shown in FIG. 5.

The reference fiber should lie physically as close as possible to the sensor fiber. For example, the reference 14 and sensor 12 fibers can be concentrically coiled in alternating layers, as shown in FIG. 5. Alternately, the reference fiber could be twisted about the sensor fiber. The intent is for the reference fiber to be exposed to all fields, with the exception of the acoustic field, in virtually the same manner as is the sensor fiber.

The sensing portion can be usefully fabricated in any shape, usually planar or otherwise defining the surface of an object, although it is advantageous to pack the sensor fiber as densely as possible so that as much of the fiber as possible is exposed to a field impinging upon the area occupied by the sensor fiber. For example, the sensor fiber can be snaked or coiled. Usually, the sensor fiber will be coiled, as shown in FIG. 5, although the coil can be other than circular (shown in FIG. 5) and can be elliptical or polygonal, e.g., triangular, square, pentagonal, hexagonal or octagonal. Also, a plurality of sensors, each with attached leads, may be joined to form an array, either within a single plane, or along multiple planes. An array of sensors along two perpendicular planes can be used to sense acoustic fields in three dimensions.

Although the sensor of the present invention is optimally produced by embedding the entire sensing portion within the low bulk modulus material (FIG. 4a), the sensor can also be produced by coating each fiber concentrically with the low bulk modulus material, as in the model of FIG. 4a. However, by embedding the sensor within the low bulk-modulus material the highest sensor fiber packing density, and the greatest ease of manufacture, are achieved. Indeed, it is extremely significant that prior to the present invention, the equivalence between the performance of sensor embedded within the layer of low bulk modulus material, as shown in FIG. 4, and the model shown in FIG. 4a, was neither known nor predicted. Thus, that equivalence is surprising. Further, it is emphasized that this equivalence holds true regardless of whether edges of adjacent turns or curves of the embedded sensor and/or reference fibers are contacting each other.

Additionally, the sensor fiber can be embedded within the low bulk modulus material so that one surface or more surfaces of the sensor fiber matrix (the external surface of the coil or snake defined by the sensor fiber) remains exposed. When mounted, one exposed surface might then face the mounting surface or plate, although the exposed surface could be a side surface not facing the mounting surface or plate. The covered surface would face the acoustic field to be sensed. A sensor constructed in that manner might be simpler to fabricate than one where the sensing fiber matrix is encased on entirely within (i.e., surrounded by) the low bulk polymer material, but may not be quite as effective in increasing fiber sensitivity.

In this regard, it should be understood that the description of the thickness of the layer of low bulk modulus material, as used in this specification and the following claims, refers to the distance between the exterior surface of the low bulk modulus coating layer and the immediately underlying surface of the sensor fiber matrix.

EXAMPLES

Having described the invention, the following examples are given to illustrate specific applications of the invention including the best mode now known to perform the invention. These specific examples are not intended to limit the scope of the invention described in this application.

Example 1 (Fabrication of a Sensor According to the Present Invention)

A planar fiber optic acoustic sensor was fabricated by first forming a planar fiber spiral in which adjacent fiber loops were physically touching. The based fiber used was a high-numerical-aperture (0.17) single-mode fiber with an 80-μm outside diameter and a 100-μm buffer jacket of silicone. The 34-m-long sensing fiber had an additional 350-μm coating of polyester (Hytrel 7246), making its total diameter 1 mm. The reference fiber was a fiber similar to that of the senor fiber with nylon 12 which was desensitized. The reference fiber was wound in pair with the sensor fiber. As shown in FIG. 5, the fiber spiral was then embedded in the center of a polyurethane layer, the overall size of which was 30 cm 30 cm 6 mm. The embedding process was performed by attaching the lower surface of the fiber spiral to the top a flat surface with double-stick tape, casting the polyurethane over the top of the attached fiber spiral, removing the coated fiber spiral and tape from the casting surface, inverting the coated spiral and taping the fiber spiral's coated surface on top of the casting surface with double-stick tape and casting polyurethane over the uncoated upper surface of the attached fiber spiral. Table 1 lists the relevant properties of the sensor fiber and polyurethane materials. Great care and controlled fabrication conditions were maintained in order to avoid encapsulation of even the smallest of air inclusions within the integrated structure.

The acoustic sensitivity of the planar fiber-optic sensor was studied by utilizing an available low-frequency pool facility in the frequency range of 250-2500 Hz. The flexible sensor was weakly attached to a 3-mm-thick Al Plate using double-sided tape and then immersed in the 9-m-diameter pool. No provision was made for water-proofing the sensing element as would be required to protect against long-term attack of the fiber-coating interface. Acoustic pressure was generated by a standard USRD G 34 projector and monitored by a reference piezoelectric transducer hydrophone (Bruel and Bjaer model 8103) placed in front of the fiber sensor 1.1 m away from the projector. This distance is consistent with farfield conditions and ensures uniform acoustic wave fronts across the planar fiber sensor with typically less than 10° of phase variation from one end to the other. FIG. 6a shows the measured acoustic response. As can be seen, the sensitivity is frequency independent over the band, and the relative optical phase shift per unit of applied acoustic pressure is:

$$\Delta\phi/\phi\Delta P = 8.9 \times 10^{-12}/(dyn/cm^2)$$

$$= -321 \text{ dB } re \frac{1}{\mu Pa}.$$

This sensitivity appears to be the largest reported to date for fiber acoustic sensors. As shown in FIG. 6, the fiber has a lower sensitivity than that of the planar sensor. As shown in FIG. 6a, the experimental data agrees well with the those predicted by analysis. As can be seen from FIG. 6, for polyurethane thickness more than 1.5 mm, the acoustic sensitivity of the sensing fiber increases very slowly. In the analysis of the sensitivity of the reference fiber, all strains were taken into account. For the reference fiber, only the radial strain, the second term in the previously mentioned equation, was calculated and it was found to be 28 dB lower than that of the sensing fiber. Thus, to a good approximation, the sensitivity of the reference fiber can be taken to be zero. The minimum detectable pressure was found to be:

$$P_{min} = 30 \text{ dB re } 1 \text{ }\mu Pa$$

with $\phi_{min} = 10^{-6}$ radians.

The acceleration sensitivity of the senor of example 1 was obtained by mounting it of a honeycomb Al plate (33-cm diameter and 1.9-cm thickness) that was very light (380 g) but stiff. The plate consisted of two 0.8-mm-thick Al plates connected with thin Al hexagons. The sensor was held to the Al plate with double-sided tape. A reference accelerometer was also mounted on the opposite side (bottom) of the Al plate. The plate was then vibrated in air by an electrically driven shaker (Bruel and Bjaaer model 4806). The acceleration sensitivity was found to be:

$$\Delta\phi/\phi\Delta g = -144.3 \text{ dB re } 1/g \text{ (100-800 Hz)},$$

$$\Delta\phi/\phi\Delta g = -149 \text{ dB re } 1/g \text{ (850-14 1000 Hz)}.$$

Combining these results with the previously mentioned equation gives the following acoustic-to-acceleration sensitivity: $-177$ to $-172$ dB re $g/\mu Pa$. For comparison, identical acoustic and acceleration measurements were made on a piezoelectric polymer ($PVF_2$) sensor having similar geometry and embedded in a similar polyurethane layer. These combined results gave $-191$ dB re $g/\mu Pa$ for the acoustic-to- acceleration sensitivity of the piezoelectric polymer sensor. The sensitivity is 14 to 19 dB lower than that found for the fiber optic device of example 1, which indicates superior performance for the fiber sensor in a vibrationally noisy environment. The reason for the superior acceleration performance of this sensor compared with that of its $PVF_2$ counterpart is not clear at this time, owing to the lack of an exact structural response model. However, while it is not intended to be bound by theory, it is believed that the superiority is largely due to $PVF_2$'s intrinsic high response to uniaxially generated strains.

TABLE 1

| | Standard Single-Mode Fiber | | | | |
|---|---|---|---|---|---|
| | Core | Clad | First Coating (Soft) | Second Coating (Hard) | Polymer Layer |
| Composition | $SiO_2$ | 95% $SiO_2$ 5% $B_2O_3$ | Silicone | Hytrel (7246) | Uralite 3130 (polyurethane) |
| Diameter (μm) | 3.5 | 40 | 220 | 1000 | |
| Young's | 72.5 | 72 | 0.0035 | 1.2884 | 0.794 |

TABLE 1-continued

| | Standard Single-Mode Fiber | | | | |
| --- | --- | --- | --- | --- | --- |
| | Core | Clad | First Coating (Soft) | Second Coating (Hard) | Polymer Layer |
| modulus ($10^{10}$ dyn/cm$^2$) | | | | | |
| Poisson's ratio | 0.17 | 0.168 | 0.49947 | 0.452 | 0.45 |
| $P_{11}$ | 0.126 | | | | |
| $P_{12}$ | 0.27 | | | | |
| n | 1.458 | | | | |

The fiber optic sensors of the present invention offer several advantages:

The sensors can be totally dielectric at the wet or sensing location. Contrary to PZT or PVF$_2$ transducers, the fiber output signal is light and not electricity. Therefore, fiber sensors can be totally dielectric at the wet end and thus are immune to electromagnetic interference. Moreover, the fiber sensors can be controlled remotely, that is, the electronics (light source and detector) can be far away from the sensing location.

Also, planar fiber optic sensors can have a density and acoustic impedance very similar to those of water. This feature is desirable for minimizing weight and sound scattering in underwater applications. PZT transducers, on the other hand, are heavy and their acoustic impedance is different from that of water;

Fiber optic sensors may form any shape and can cover a large area. This feature is highly desirable when large surfaces, such as the bottom of the sea, must be covered. PZT transducers lack such flexibility;

The wet end of the fiber optic sensors can be inexpensive since the electronics (light source and detection system) can be far away in a safe location;

Planar fiber optic sensors can provide high sensitivity and very small minimum detectable pressure;

Planar fiber optic sensors can be designed to maximize acoustic sensitivity while at the same time the sensor can have minimal sensitivity to fields such as temperature, acceleration and flow noise. This end can be accomplished by optimizing the reference and the sensing fibers as described above;

Fiber optic sensors can operate in hostile environments such as high electric fields, chemically corrosive places, and explosive environments;

Fiber optic sensors can provide safety of operation which cannot be offered by PZT or PVF$_2$transducers.

Obviously, many modifications and variations of the present invention are possible in light of the above teachings. It is therefore to be understood that, within the scope of the appended claims, the invention may be practiced otherwise than as specifically described.

What is claimed is :

1. A sensing portion for an interferometric acousto-optic sensor portion, comprising:
a concentrically wound or snaked sensor fiber having a solid light-transmitting core and a clad layer surrounding said core; and
a layer of a material within which said sensor fiber is embedded, said material having a bulk modulus of no greater than about $5(10^{10})$ dyn/cm$^2$ at 1 MHz at its ambient temperature of use, said layer being sufficiently thick to significantly increase the pressure sensitivity of said fiber within a frequency range of about 250–2500 Hz.

2. The sensing portion of claim 1, further comprising a buffer layer between said clad and said layer of material, and a hard plastic layer between said buffer layer and said layer of material.

3. The sensing portion of claim 1, wherein said core and clad are made of glass.

4. The sensing portion of claim 1, wherein said material is a polymer.

5. The sensing portion of claim 4, wherein said polymer is polyurethane.

6. The sensing portion of claim 1, wherein said layer of material has a thickness of about 1–20 mm.

7. An acousto-optic interferometric sensor comprising:
a light source;
a detector;
a sensing portion including: a concentrically wound or snaked sensor fiber having a solid light-transmitting core and a clad layer surrounding said core; and a layer of a material within which said sensor fiber is embedded, said material having a bulk modulus of no greater than about $5(10^{10})$ dyn/cm$^2$ at 1 MHz at its ambient temperature of use, said layer being sufficiently thick to significantly increase the pressure sensitivity of said fiber within a frequency range of about 250–2500 Hz;
a first lead fiber extending between said light source and said sensing portion; and
a second lead fiber extending between said sensing portion and said detector.

8. An acousto-optic sensor according to claim 7, wherein said sensing portion further comprises a pressure-insensitive reference fiber connected to said first and second lead fibers.

9. An acousto-optic sensor according to claim 8, wherein said reference fiber is embedded within said layer of material.

10. An acousto-optic sensor according to claim 9, wherein said sensor fiber is coiled.

11. An acousto-optic sensor according to claim 10, wherein said reference fiber is coiled concentrically with respect to said sensor fiber.

12. An acousto-optic sensor according to claim 10 wherein said sensor fiber is coiled in the form of a spiral.

13. An acousto-optic fiber according to claim 10, wherein said sensor fiber is coiled into a polygonal shape.

14. An acousto-optic sensor according to claim 10, wherein said sensor fiber is coiled into an elliptical shape.

* * * * *